United States Patent [19]

Naito

[11] 3,773,334

[45] Nov. 20, 1973

[54] TAPE CARTRIDGE EJECTING DEVICE

[75] Inventor: Morihisa Naito, Osaka, Japan

[73] Assignee: Matsushita Electric Industrial Co., Ltd., Osaka-fu, Japan

[22] Filed: Aug. 12, 1971

[21] Appl. No.: 171,069

[30] Foreign Application Priority Data

Aug. 21, 1970 Japan .......... 45/73567
Aug. 21, 1970 Japan .......... 45/73568
Aug. 21, 1970 Japan .......... 45/73569

[52] U.S. Cl. .......... 274/4 F, 242/198
[51] Int. Cl. .......... G11b 5/00
[58] Field of Search .......... 274/4 B, 4 C, 4 E, 274/4 F, 4 A; 179/100.2 Z; 242/55, 19 A, 198

[56] References Cited

UNITED STATES PATENTS

| | | | |
|---|---|---|---|
| 3,489,417 | 1/1970 | Harper | 274/4 B |
| 3,492,005 | 1/1970 | Ueno | 274/4 B |
| 3,556,534 | 1/1971 | Bara | 274/4 A |
| 3,572,723 | 3/1971 | Jenkins | 274/4 B |
| 3,666,208 | 5/1972 | Beretta | 274/11 C |

*Primary Examiner*—Leonard D. Christian
*Attorney*—Milton J. Wayne et al.

[57] ABSTRACT

A cartridge ejection control arrangement for a multiple track cartridge type recording and reproducing apparatus, in which structure is provided for selectively permitting the ejection of a cartridge automatically after playing or reproducing of the last channel, ejection automatically of the cartridge after the recording or reproduction of each channel, and for permitting continuous operation without ejection. The structure includes a first lever system for operating an ejection mechanism in response to a track selection device, the movement of the first lever system being effected by a cam on the apparatus drive means. The first lever system is operative on the last channel. A second lever system coupled to the first lever system effects the control of the first lever system for ejection of a cratridge after the reproducing or recording of each track. A third lever system is provided to control the operative positions of the first and second lever systems, and to inhibit operation of the ejection mechanism. A fourth lever system responsive to recording in the apparatus automatically controls the third lever system to effect the ejection of a cartridge after the last track has been recorded.

13 Claims, 12 Drawing Figures

TAPE CARTRIDGE EJECTING DEVICE

BACKGROUND OF THE INVENTION

The present invention relates to generally a tape cartridge ejecting device for use with a recording and reproducing apparatus and more particularly to a tape cartridge ejecting device of the type wherein a cartridge is automatically ejected out of the apparatus upon completion of recording.

In the prior art magnetic recording and reproducing apparatus utilizing tape cartridges, the cartridge is manually removed out of the apparatus upon completion of recording.

The present invention contemplates an improvement of the prior art manual cartridge removing device so that the cartridge may be manually or automatically ejected.

One of the objects of the present invention is therefore to provide a tape cartridge ejecting device for use with a magnetic recording and reproducing apparatus.

Another object of the present invention is to provide a device for manually or automatically removing a cartridge by a lever mechanism out of a magnetic recording and reproducing apparatus.

Another object of the present invention is to provide a device for ejecting a cartridge by engaging a channel switching cam with a cam attached to a capstan under the rotational force of a flywheel.

Another object of the present invention is to provide a tape cartridge ejecting device in which a first, second and third lever groups are provided wherein when the third lever group is in its first position a projection of a channel switching cam engages a part of the first lever group when said third lever group is in its second position a part of the second lever group engages a solenoid rod or the projection of the channel switching cam engages with a part of the first lever group, and when the channel is switched, a capstan cam engages a notch of the first lever group under the rotational force of a flywheel to eject a cartridge.

Another object of the present invention is to provide a tape cartridge ejecting device wherein a first, second, third and fourth lever groups are provided, and when the third lever group is in its third position, a projection of a channel switching cam, a projection of the first lever group and the second group are released from a solenoid rod so that a cartridge will not be ejected, and upon completion of recording the third lever group is switched to its first position by the fourth lever group so as to eject the cartridge.

The above and other objects, features and advantages of the present invention will become more apparent from the following description of the preferred embodiment thereof taken in conjunction with the accompanying drawing.

Figure 1:
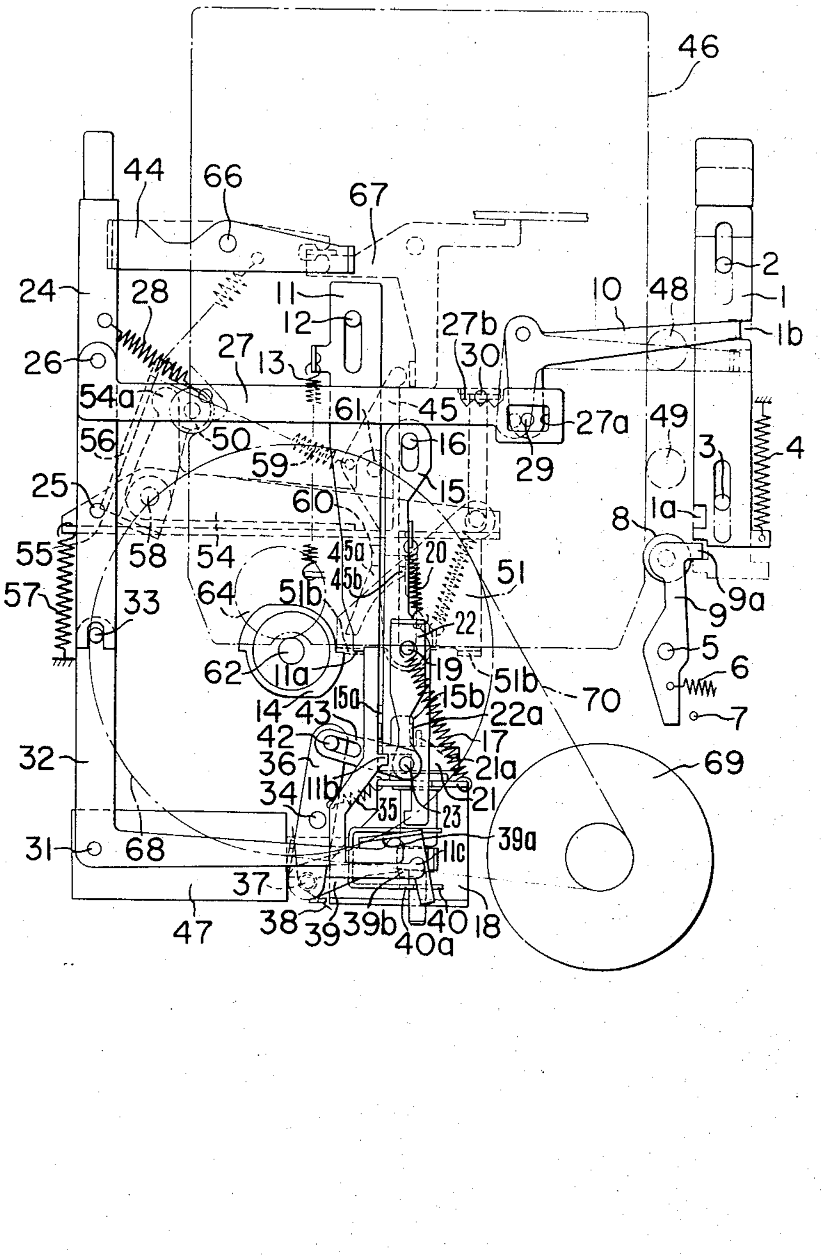
FIG. 1 is a top view of the preferred embodiment of the present invention illustrating the position of an eject lever when the recording or playback of the fourth channel is switched to that of the first channel.

DESCRIPTION OF THE PREFERRED EMBODIMENT:

Referring to FIGS. 1–6, a record lever 1 is slidably guided by guide pins 2 and 3 and is normally biased in one direction under the force of a spring 4. A notch 1a of the record lever 1 is provided to releasably engage a projection 9a of a lever 9. A roller 8 is provided on the lever 9 adjacent to the projection 9a and the lever 9 is normally biased to rotate about a shaft 5 in one direction (in the counterclockwise direction in the figures) under the force of a spring 6. The shaft 5 is securely fixed to a base plate (not shown), and a pin 7 serves to limit the rotation of the lever 9. One end of a safety lever 10 which is rotatably fixed to the base engages a center notch 1*b* of the record lever 1, so that when the record lever 1 is moved to the record mode position the lever 10 is rotated for preventing continuous recording as will be described in more detail hereinafter.

An eject lever 11 is guided slidably and rotatably by a guide pin 12 extending from an upper base (not shown) and a spring 13 and is provided with a projection 11*a* for engagement with a cam 14.

Figures 9, 10, 11, 12:
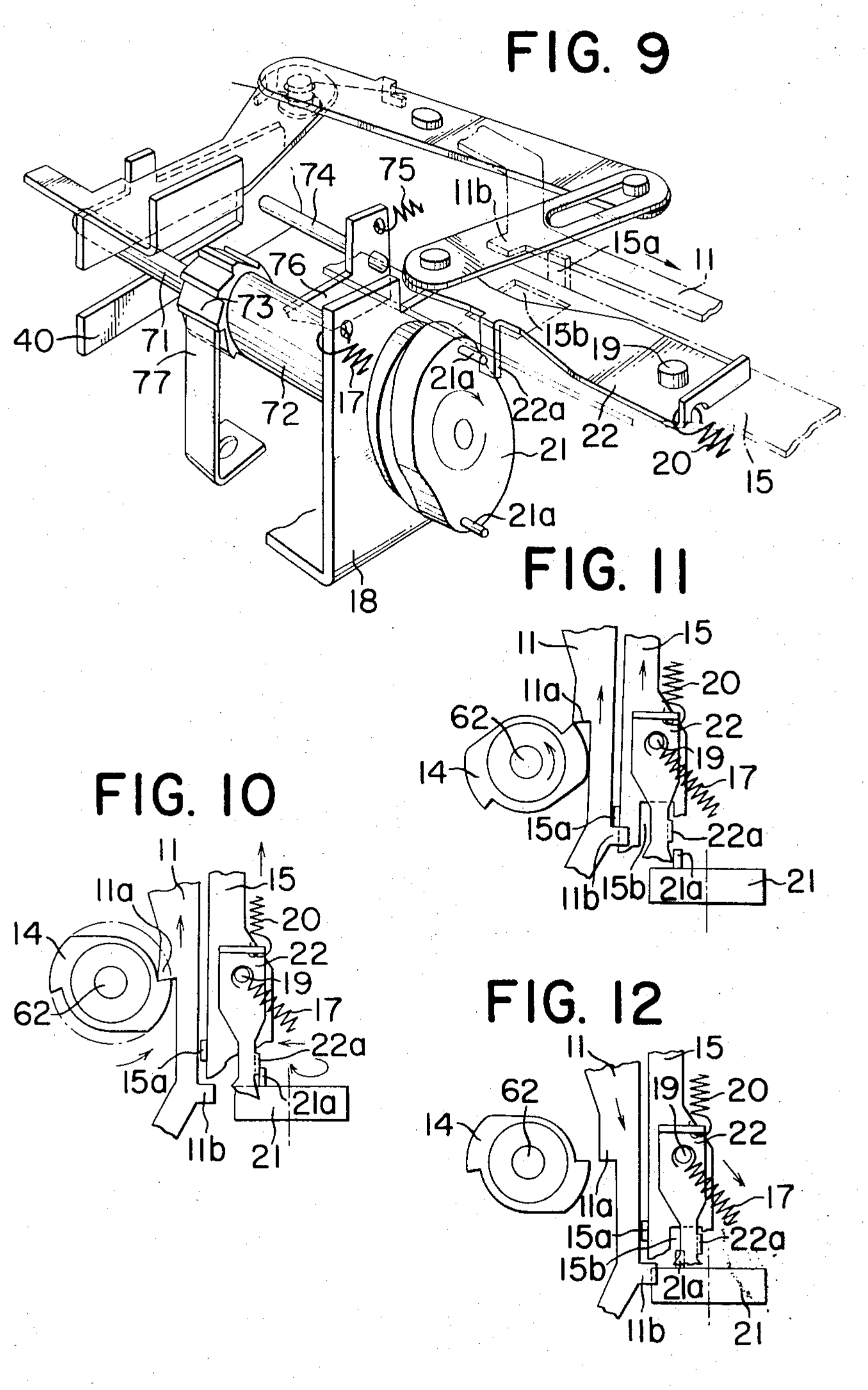
FIG. 9 is a fragmentary perspective view illustrating the relation between a channel switching cam for switching the positions of a head and the eject lever.
FIGS. 10, 11 and 12 are views illustrating the modes of operations and positions of the channel switching cam, the eject lever and the cam when the recording or playback of the fourth channel is switched back to that of the first channel.

A detection lever 15 is also slidably and rotatably guided by a guide pin 16 extending from the upper base (not shown) and a spring 17 so as to stop at a predetermined position when engaged with a mounting plate 18. A projection 15a at one end of the detection lever 15 engages the eject lever 11. An elongated member 22 which is normally biased to rotate in one direction about a pin 19 extending from the detection lever 15 under the force of a spring 20, has a projection 22*a* extending through an aperture 15*b* formed in the lever 15, the projection 22*a* engaging a projection 21a of a channel switching cam 21 on the other side of the lever 15 as seen in FIG. 9. A pivot pin 23 extends from one end of the elongated member 22.

Thus when the eject lever 11 slides upwardly (in FIG. 1), its projection 11*a* engages the projection 15*a* of the detection lever 15 to cause it to slide. When the projection 11*a* of the eject lever 11 is released from the cam 14, the detection lever 15 is returned to its initial position under the force of the springs 17 and 20. The ejection lever 11, the detection lever 15 and the elongated lever 22 constitute a first lever linkage system.

An eject switching lever 24 is pivoted on a pin 25, and a positioning lever 27 is pivoted to the eject switch lever 24 on a pin 26 and is normally biased in one direction under the force of a spring 28. A pin 29 extending from the safety lever 10 engages an aperture 27*a* formed at one end of the positioning lever 27. A W-shaped notch 27*b* is formed in the proximity of the aperture 27*a* of the positioning lever 27 and engages a pin 30 extending from the upper base (not shown) so that the lever 24 may be held in one of three different positions.

One end of the eject switching lever 24 is engages a pin 33 extending from a lever 32 pivoted with a pin 31. These levers 24 and 32 constitute a third lever linkage while the levers 10 and 27, a fourth lever linkage.

One end of the lever 32 engages a projection 39*a* of a lever 39, the lever 39 being pivoted on a pin 37 at one end of a lever 36 which in turn is pivoted to a base (not shown) on a pin 34. The lever 36 is biased to rotate in one direction under the force of a spring 35. The lever 39 is biased to rotate in one direction under the force of a spring 38, and is provided with a projection 39*b* which engages a projection 40*a* of a solenoid rod 40. The levers 36 and 39 constitute a second lever linkage. When the eject switching lever 24 is switched to the ejection position (See FIG. 3) when the recording or playback of one channel is accomplished, the lever 39 engages the solenoid rod 40. When the solenoid rod 40 is returned to its initial position under the force of a solenoid spring 41, the lever 39 is displaced to rotate the lever 36. (See FIGS.4 and 5). A connecting rod 43 connects a pin 42 at the other end of the lever 36 with a pin 23 of the lever 22 so that upon rotation of the lever 36 the projection 15*a* of the detection lever 15 causes the eject lever 11 to rotate. Therefore the projection 11a of the eject lever 11 engages the cam 14, and the eject lever 11 further slides to engage one end of a manual eject lever 44, thereby rotating it to release a lock lever 45 to eject a cartridge 46.

The levers 36 and 39 and the connecting rod 43 constitute a second lever system.

One end 11*c* of the eject lever 11 is positioned to engage the projection 39*a* of the lever 39, and when the eject lever is displaced, the projection 39b is released from the projection 40a of the solenoid rod 40. Thus when the lever 36 is returned to its initial position, it imparts no rotational force so that the cartridge is not until a solenoid is actuated.

Figure 7:
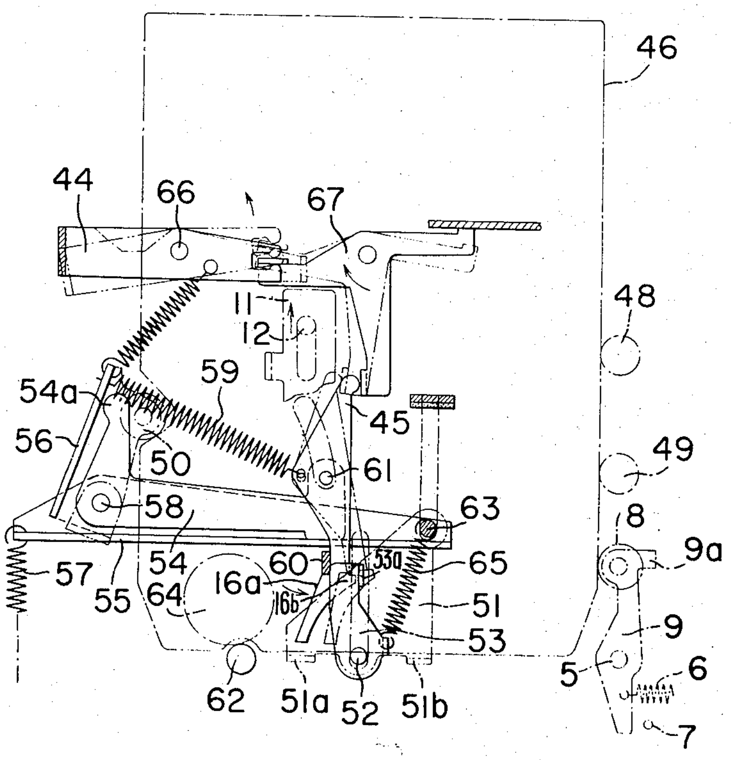
FIG. 7 is a top view illustrating that the cartridge is inserted into engagement with a tape transport mechanism.

Next the mode of operation will be described. The cartridge 46 is guided by guide rollers 48 and 49 and a lock roller 50 until its front surface contacts projections 51*a* and 51*b* of a sliding plate 51 to displace it. A projection 53*a* of a lever 53 (FIGS. 7 and 8) pivoted to the sliding plate 51 a pin 52 engages with the projection 45*b* of the lock lever 45 thereby forcing levers 54, 55 and 56 to rotate about a pin 58 against the force of a spring 57. When the cartridge 46 and the sliding plate 51 are further displaced, the lock roller 50 contacts one side surface of the cartridge 46 and is pressed against it under the force of a spring 59. When the cartridge 46 is further inserted, the projection 45*a* of the lock nut 45 engages a projection 60 extending from the base (not shown), and at this moment the lock roller 50 is positioned on the sloping surface of a V-shaped notch formed at the side surface of the cartridge 46. When the cartridge 46 is further inserted slightly from this position, the lock lever 45 is caused to rotate in the clockwise direction under the force of the spring 59 so that its projection 45*a* engages the projection 60. At the same time the projection 53*a* of the lever 53 is released from the projection 45*b* of the lock lever 45 so that the tape in the cartridge 46 is pressed against a capstan 62 only under the force of the lock roller 50, whereby the tape is transported. In this case, the sliding plate 51 is slidable as shown in FIG.7 with some gap.

Figure 8:
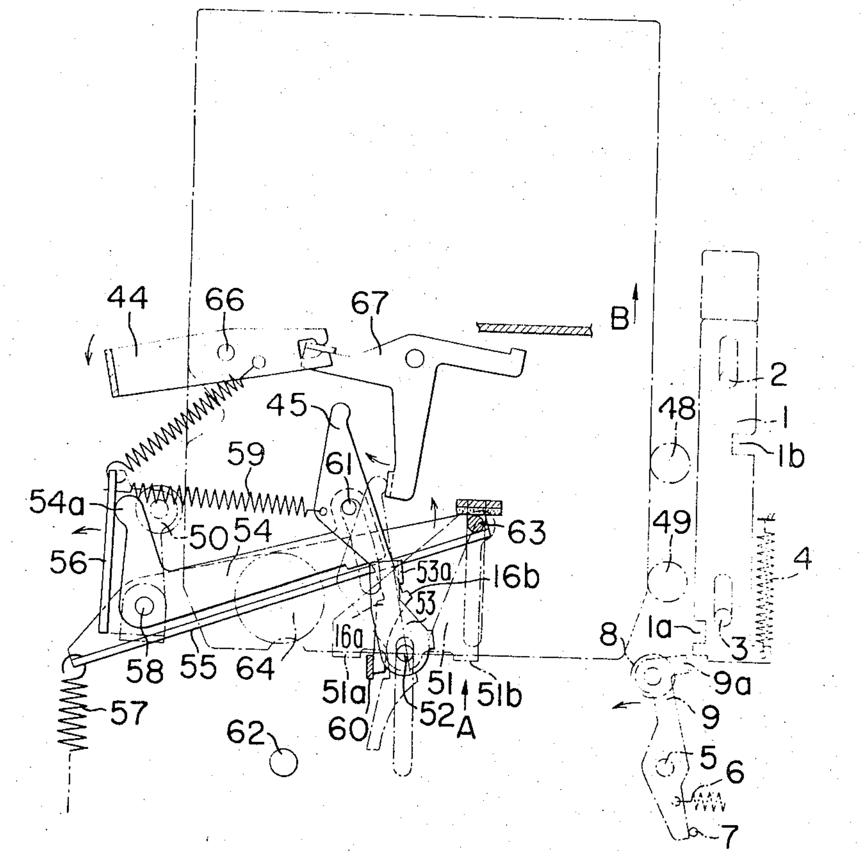
FIG. 8 is a top view illustrating the cartridge being manually ejected or automatically ejected by the eject lever.

Next referring to FIGS.7 and 8 the cartridge insert and eject mechanism will be described. When the cartridge 46 is inserted, it is guided by the guide rollers 48 and 49, the sliding plate 51 which in turn is guided by the pins 52 and 63 and the lock roller 50 carried by the lever 56 pivoted on the pin 58, and a pinch roller 64 contacts the capstan 62 to transport the tape.

The lever 53, pivoted to the sliding plate 51 at the pin 52 and biased to rotate in the counterclockwise direction under the force of the spring 65, is provided with a projection 53*a*. The lock lever 45 is pivoted on the pin 61 to one end of the L-shaped lever 54 which in turn is pivoted on the pin 58, and is biased to rotate in the clockwise direction under the force of the spring 59 between the lever 56 and the same. The projections 45*a* and 45*b* engage the lever 53.

The lever 55 is pivoted on the pin 58 and is biased to rotate in the counterclockwise direction under the force of the spring 57. One end of the lever 55 engages a pin 63 of the sliding plate 51 when the cartridge 46 is ejected, and is released therefrom in the record or playback mode. An upright ridge is formed at the center of the lever 55 for engagement with one end of the L-shaped lever 54. The manual eject lever 44 is rotatable about a pin 66 and is positioned to engage one end of the lock lever 45 in the record or playback mode. When the manual ejecter lever 44 is rotated about the pin 66 in the counterclockwise direction the lock lever 45 is also rotated in the counterclockwise direction and is released from the projection 60 extending from the base (not shown). As a consequence the lever 55 is rotated in the counterclockwise direction under the force of the spring 57. One end of the lever 55 engages the pin 63 of the sliding plate 51 whereby it is displaced in the direction for ejecting the cartridge 46 and the projections 51a and 51b engages the cartridge 46 to eject it out of the tape recorder.

In FIG. 1, the cam 14 and a flywheel 68 are attached to the capstan 62 and are rotated from a motor 69 through a belt 70.

Next referring to FIG.9, the channel switching mechanism will be described. The channel switching cam 21 is provided with a pair of projections or pins 21*a* and is carried by a shaft 71 for rotation. The shaft 71 is supported by a bearing 72 which in turn is supported by a bracket 18. A ratchet wheel 73 is carried by the shaft 71 and rotated in a single direction by a mechanism comprising the solenoid 47, the plunger spring 41 (see FIG. 5), the solenoid rod 40, and a pawl 76 carried by a shaft 74 and loaded with a spring 75. The reverse rotation of the ratchet wheel 73 is prevented by a spring 77.

Next the mode of ejecting the cartridge will be described. When a force is applied to one end of the manual eject lever 44 or the eject lever 11 is pressed against the other end of the manual eject lever 44 to rotate it in the counterclockwise direction, the lever 67 which engages the one end of the manual eject lever 44 is rotated in the clockwise direction, whereby the projection 45*a* of the lock lever 45 is released from the projection 60 extending from the base (not shown).

When the lock lever 45 is released, the other end of the L-shaped lever 54 is rotated until it engages the lever 56 under the force of the spring 59 loaded between the lever 56 carrying the lock roller 50 and the lock lever 45. As a consequence the force on the lock roller 50 is relieved, and the lever 55 is rotated in the counterclockwise direction under the force of the spring 57. Since the one end of the lever 55 engages the pin 63 of the sliding plate 51 the plate 51 is caused to slide in the direction indicated by the arrow A in FIG.8 so that the cartridge 46 is pushed in the direction indicated by the arrow B by the projections 51a and 51*b*.

Next the recording mode will be described. In this case, when the cartridge 46 is inserted, the record lever 1 is pushed against the spring 4 so that the lever 9 is rotated as the roller 8 carried by this lever is pushed away by the side surface of the cartridge being inserted. As a consequence, the projection 9*a* of the lever 9 engages the notch 1*a* of the record lever whereby the record lever is securely held in record mode position. When the cartridge is ejected in a manner described hereinbefore, the lever 9 is rotated in the counterclockwise direction under the force of the spring 6 whereby the projection 9*a* is released from the notch 1a of the record lever 1*a*. Thus the record mode is released.

Next the automatic ejection mode will be described.

FIG.1 shows that the recording or playback of the fourth channel is accomplished so that the eject switching lever 24 is in the automatic cartridge eject position when the tape recorder is switched to the recording or playback of the first channel. In this position tape is being transported. (Fourth channel position).

Figure 2:
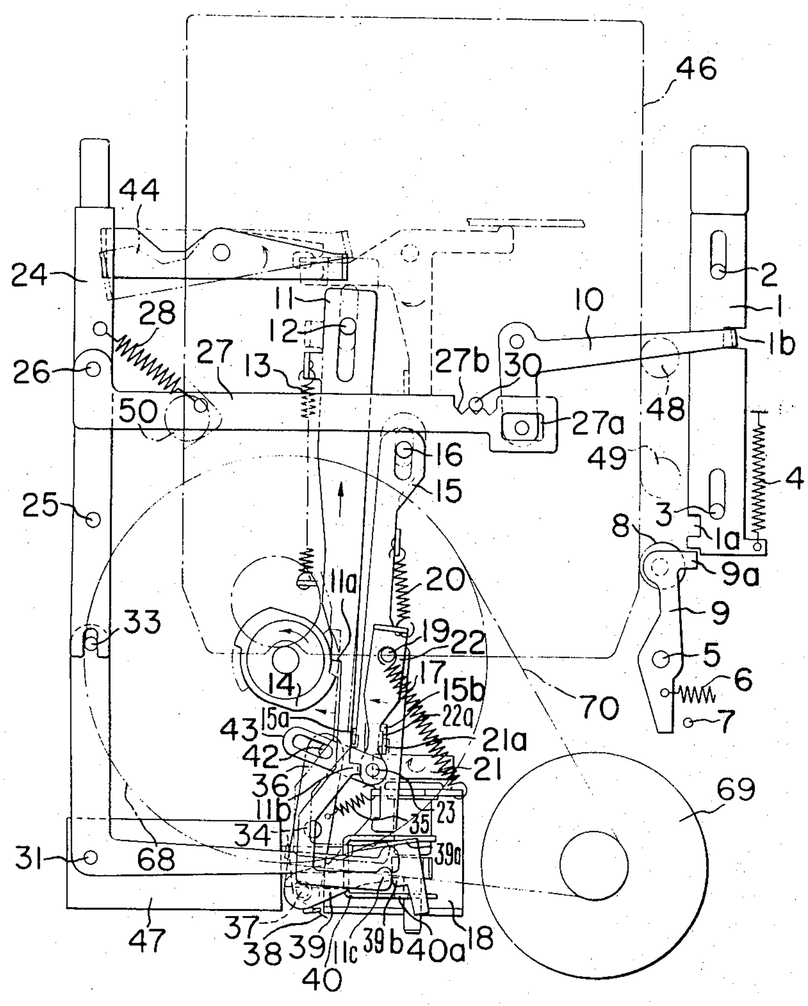
FIG. 2 is a view similar to FIG. 1 illustrating the cartridge immediately before it is ejected as the eject lever is rotated into engagement with a cam upon completion of the recording or playback of the fourth channel.

FIG.2 shows that the recording or playback of the fourth channel is accomplished so that the channel switching cam 21 is switched to the first channel position by the solenoid 47. The projection 21a of the channel switch cam 21 engages the projection 22a of the lever 22 to rotate it against the spring 20.

In this case, the detection lever 15 is rotated by the lever 22 and the spring 20 and the eject lever 11 is rotated since the projection 15a of the detection lever 15 engages therewith. Thus, the projection 11*a* of the eject lever 11 engages the cam (See FIG.10).

Even when the projection of the cam 14 registers with the projection 11*a* of the eject lever 11, the lever 22 is rotated against the spring 20 and resiliently presses against the projection 11*a* until it engages with the next cam portion of the rotating cam 14. Therefore, any mis-engagement may be prevented.

The eject lever 11 is displaced while the projection 11a of the eject lever 11 is held in engagement with the cam 14 to the position shown in FIG.11. Next the eject lever 11 is slidably displaced to have its projection 11*b* engaged the projection 15a of the detection lever 15 so that it is displaced and the projection 21*a* of the channel switching cam 21 is released from the projection 22*a* of the lever 22.

In response to the displacement of the eject lever 11, the manual eject lever 44 is rotated so that the eject operation is started in the manner described hereinbefore.

When upon rotation of the cam 14 the projection 11*a* of the eject lever 11 is released, both of the eject lever 11 and the detection lever 15 are returned to their initial positions (see FIG.12) under the forces of the springs 20 and 17 respectively.

Therefore, the next cartridge inserted will not be ejected out of the tape recorder until the recording or playback of the fourth channel is accomplished.

Next the mode of automatically ejecting the cartridge whenever the recording or playback of each channel is accomplished will be described.

Figure 3:
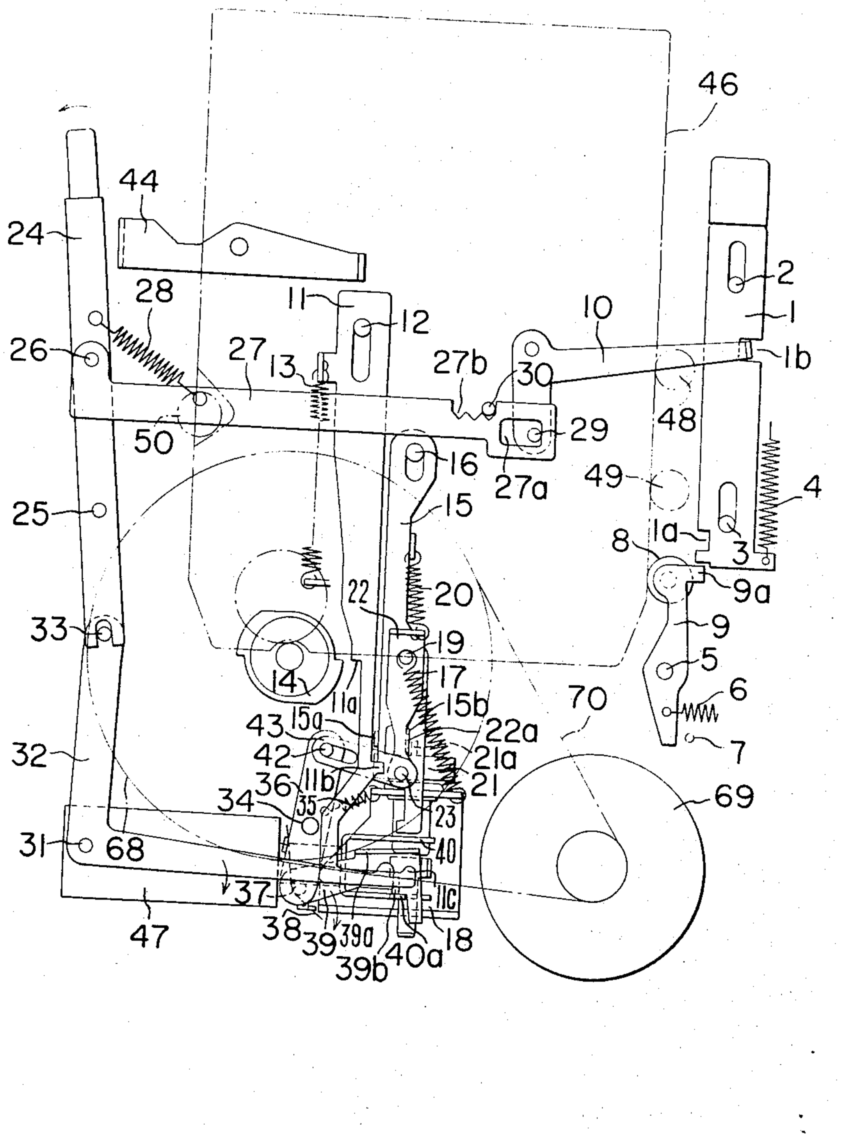
FIG. 3 is a view similar to FIG. 1 illustrating the position of an eject switching lever which was switched to the ejecting position when the recording or playback of one channel is switched to that of the next channel.
Figure 4:
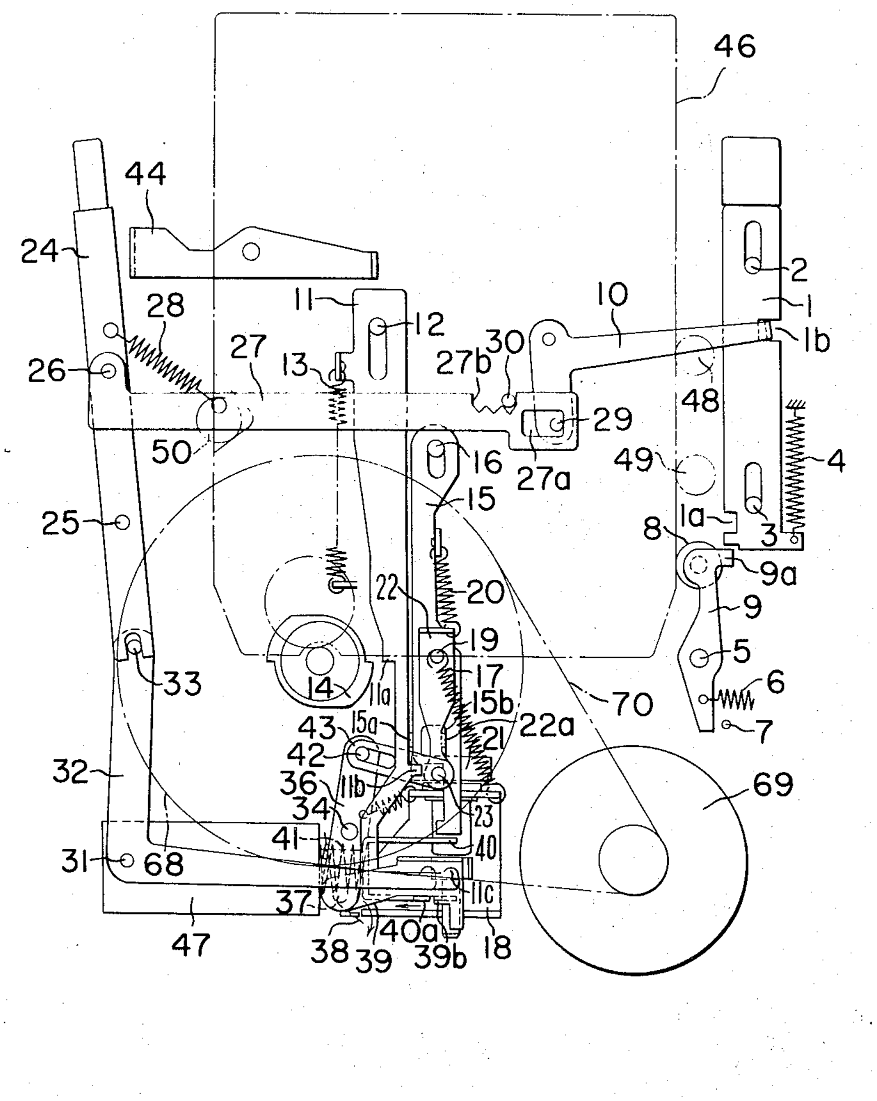
FIG. 4 is a view similar to FIG. 3 illustrating that a solenoid is energized in order to switch the recording or playback of one channel to that of the next channel.
Figure 5:
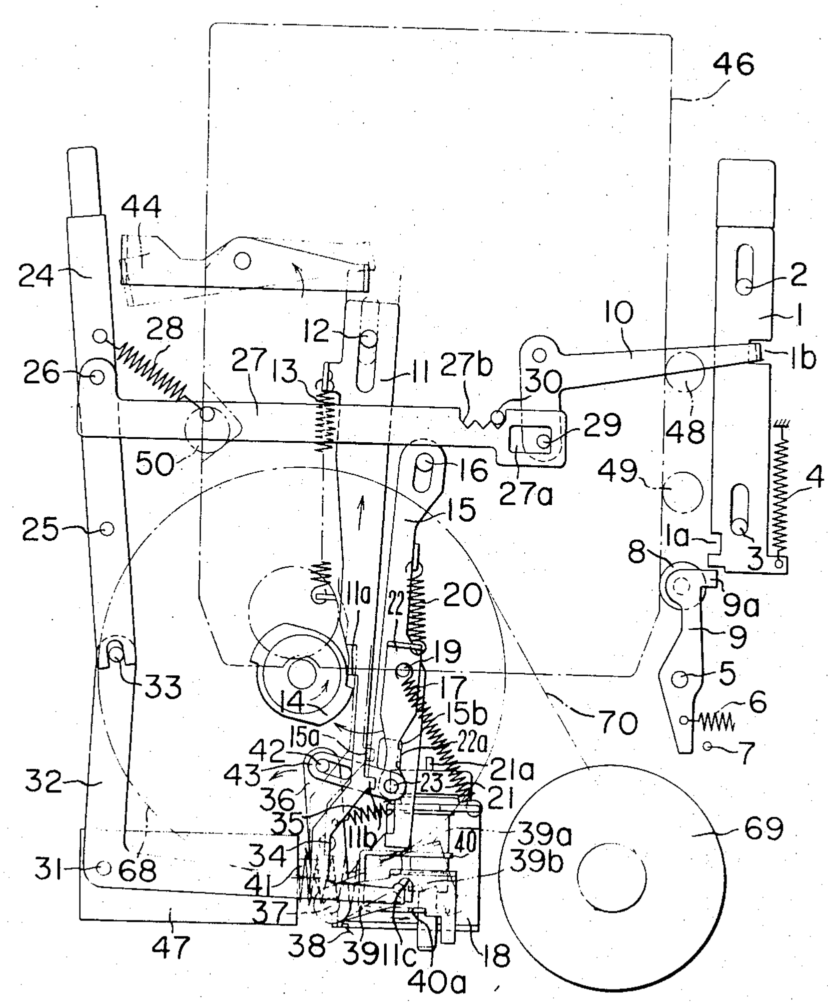
FIG. 5 is a view similar to FIG. 4 illustrating that the solenoid is returned to its initial position; the next channel is selected; and the eject lever is rotated into engagement with the cam.

As shown in FIG.3 whenever the recording or playback of each channel is accomplished, the eject switching lever 24 is switched to the eject position. The lever 32 is rotated about the pin 31 as the pin 33 engages the lever 24 and is held in position by the positioning lever 27, the pin 30, the notch 27*b* of the positioning lever 27 and the spring 28.

Upon rotation of the lever 32, it is released from the projection 39*a* of the lever 39 so that the lever 39 rotates in the clockwise direction under the force of the spring 38 and engages the projection 40*a* of the plunger rod 40. Upon completion of the recording or playback the solenoid 47 is actuated to extend its plunger rod 40 to the left as shown in FIG.3 so that the lever 39 rotates in the clockwise direction. As a consequence the projection 40*a* of the solenoid rod 40 engages the projection 39*b*.

When the solenoid is de-energized, the solenoid rod 40 is displaced to its initial position under the force of the spring 41 and the channel switching cam 21 rotates to the next channel position through the pawl 76, the ratchet wheel 73 and the shaft 71. The lever 39 is displaced to rotate the lever 36 thereby rotating the lever 22 by way of the pin 42, the connecting rod 43 and the pin 33. Thus the cartridge eject operation is started when the recording or playback of the fourth channel is accomplished (See FIG.5).

When the eject lever 11 slides so that its end 11*c* engages the projection 39*a* of the lever 39, the lever 39 rotates in the counterclockwise direction so that the projection 40*a* of the plunger rod 40 is released from the projection 39*b* of the lever 39. As a consequence the lever 36 is rotated in the clockwise direction under the force of the spring 35 to return to its initial position shown in FIG.4. Therefore, the next cartridge inserted will not be ejected out of the tape recorder until it is switched to the recording or playback mode of the next channel.

Figure 6:
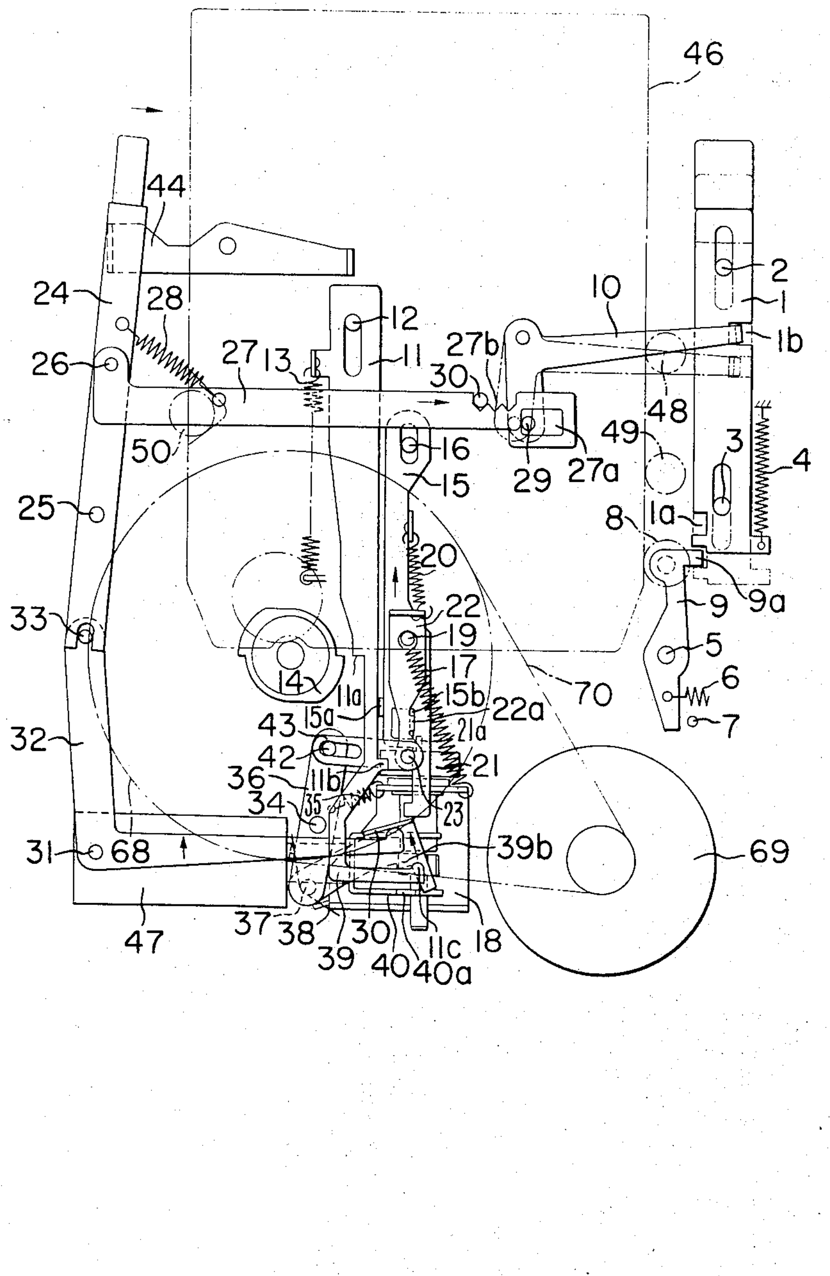
FIG. 6 is a view similar to FIG. 5 illustrating the position of the eject switching lever for continuous playback.

When the switching lever 24 is switched to the position shown in FIG.6 for continuous playback mode, the lever 32 is rotated in the counterclockwise direction to engage the projection 39*a* of the lever 39. As a consequence the lever 39 rotates in the counterclockwise direction to push one end of the detection lever 15 with the projection 39*a*, thereby releasing the projection 21*a* of the channel switching cam 21 from the projection 22*a* of the lever 22.

Therefore even when the solenoid 47 is energized for switching the channel, the lever 39 will not engage. Furthermore the projection 21*a* of the channel switching cam 21 is released from the projection 22*a* of the lever 22, so that the cartridge will not be ejected out of the tape recorder. Thus the tape is continuously played back.

When the cartridge is inserted while the record lever 1 is operated with the switching lever 24 in the continuous playback position, the safety lever 10 one end of which engages the notch 1*b* of the record lever 1, is rotated so that the positioning lever 27 is displaced toward the left by the pin 29 at the other end of the safety lever 10. Thus, the cartridge is ejected when the recording or playback of the fourth channel is accomplished.

Therefore, when the recording of the fourth channel is accomplished and the tape recorder is switched to the recording mode of the first channel, the cartridge is automatically ejected out of the tape recorder. Therefore "double" recording may be prevented.

The eject operation is started in response to the last half of the operation of the solenoid 47, so that even when the eject operation is started immediately the channel switching sensing tape passes through a sensing means. Therefore the next cartridge inserted will not be ejected out of the tape recorder.

The mechanism for ejecting the cartridge in accord with the present invention has the following advantages. First the mechanism is inexpensive to manufacture. Since the cartridge is ejected at the end of the recording or playback of each channel or the fourth channel, the operation is simple and the desired portion of the tape may be selected when the next recording or playback is made. The operation of the mechanism is thus easily effected. When the recording is made, the tape recorder is automatically switched from the continuous playback position to the ejection position at which time the cartridge is automatically ejected at the completion of the recording or playback of the fourth channel so that the "double" recording may be prevented. Since the cartridge is ejected out of the tape recorder by a purely mechanical mechanism, the cartridge ejecting operation is not influenced by the voltage drop of the power source even when the solenoid is used.

What is claimed is:

1. A cartridge ejection control mechanism for a multiple track cartridge type recording and reproducing apparatus having an ejection mechanism, drive means including a fly wheel, and track selection means; said control means comprising a rotatable channel switching cam having projections, means for rotating said channel switching cam in response to said track selection means, a second cam coupled for rotation to said drive means, and first lever means, said first lever means comprising means for engaging said projections for operatively coupling said first lever means to said second cam for movement in response to rotation of said second cam, said first lever means being positioned to operatively engage said ejection mechanism in response to movement thereof, said engaging means including means for releasing said first lever means from said projections in response to said movement of said first lever means.

2. The ejection control mechanism of claim 1 wherein said first lever means comprises a first axially movable lever normally positioned out of engagement with said second cam and said ejection mechanism, and said engaging means comprises a second axially movable lever positioned to engage said first lever, and a third lever pivoted on said second lever and positioned to engage said projections, whereby engagement between said third lever and said projections urges said second lever to effect said coupling between said first lever and said second cam for urging said first lever to engage said rejection mechanism.

3. The ejection control mechanism of claim 2 wherein said track selection means comprises a solenoid, comprising ratchet means coupled to said solenoid for rotating said channel switching cam, said projections being positioned to engage said first lever means only in response to the selection of the last track.

4. The ejection control mechanism of claim 1 further comprising second and third lever systems, said third lever system comprising a control lever having a first position for automatic ejection of cartridges after the last track, a second position for automatically ejecting a cartridge after each track, and a third position for continuous operation of said apparatus, said projections on said switching cam being positioned to engage said first lever means only in response to the selection of the last track, said second lever system being positioned to effect the engagement of said first lever means with said second cam means at the end of each track in response to positioning of said second lever system in said second position, said control mechanism further comprising means responsive to the positioning of said third lever system in said third position for inhibiting engagement between said first lever means and said second cam.

5. The control mechanism of claim 4 for use in an apparatus having a record lever, further comprising a fourth lever system operatively coupled to said record lever and said third lever system for moving said third lever system to said first position when said record lever is in operative record position.

6. The ejection control mechanism of claim 1 wherein said means for rotating said channel switching cam in response to said track selection means comprises a solenoid responsive to selection of tracks in said apparatus, and ratchet means coupled to rotate said channel switching cam in response to selection of tracks, said projections being positioned to engage said first lever means only on the selection of the last track.

7. The ejection control mechanism of claim 6 wherein said first lever system comprises a first lever mounted for longitudinal and pivotal movement and normally out of engagement with said second cam and said ejection mechanism, a second lever mounted for longitudinal and pivotal movement, and a third lever pivotally mounted on said second lever, said third lever being positioned to engage said projections, whereby said projections urge said second lever by way of said third lever to urge said first lever against said second cam, so that rotation of said second cam urges said first lever into operative engagement with said ejection mechanism, resilient biasing means on said third lever, and means coupling said first and second levers for longitudinal movement whereby said longitudinal movement disengages said third lever from said projections.

8. The ejection control mechanism of claim 6 further comprising second and third lever means, said third lever means having a first position for automatic ejection of cartridges only after the last track, a second position for automatically ejecting cartridges after each track, and a third position for continuous operation of said apparatus, said third lever means being mounted to operatively couple said second lever means to said solenoid means in said second position, said second lever means being operatively coupled between said solenoid means and said first lever means in said second position for urging said first lever means into operative engagement with said second cam at each operation of said solenoid means.

9. The ejection control mechanism of claim 8 wherein said third lever means is positioned to decouple said second lever means from said solenoid means in said first and third positions.

10. The ejection control mechanism of claim 9 wherein said third lever system comprises means responsive to the selection thereof in said third position for holding said first lever system out of operative engagement with said projections.

11. The ejection control mechanism of claim 6 wherein said third lever means comprises means in said third position for moving said second lever means to move said first lever means out of operative engagement with said projections, whereby operation of said ejection mechanism by said first lever means is inhibited.

12. The ejection control mechanism of claim 6 wherein said third lever means comprises a lever having first, second and third notches, corresponding to said first, second and third positions, stop means for engaging said notches, and means for resiliently holding said lever in said stop means.

13. The ejection control mechanism of claim 6 for use in an apparatus having a recond control, further comprising a fourth lever means operatively coupled between said record control and said third lever system for moving said third lever system to said first position in the record mode of operation of said apparatus.

* * * * *